United States Patent [19]
Ozeki

[11] Patent Number: 5,226,537
[45] Date of Patent: * Jul. 13, 1993

[54] FILE SHEET FOR FILING INFORMATION RECORDING MEDIA

[75] Inventor: Jiro Ozeki, Tokyo, Japan

[73] Assignee: Slidex Corporation, Tokyo, Japan

[*] Notice: The portion of the term of this patent subsequent to Apr. 30, 2008 has been disclaimed.

[21] Appl. No.: 630,251

[22] Filed: Dec. 19, 1990

Related U.S. Application Data

[63] Continuation-in-part of Ser. No. 413,699, Sep. 28, 1989, Pat. No. 5,011,016.

[30] Foreign Application Priority Data

Sep. 30, 1988 [JP] Japan .................................. 63-244371

[51] Int. Cl.⁵ ............................................. B65D 1/24
[52] U.S. Cl. .................................... 206/456; 40/405; 206/459.5
[58] Field of Search ............... 206/444, 456, 455, 449, 206/459; 40/405

[56] References Cited

U.S. PATENT DOCUMENTS

| | | | |
|---|---|---|---|
| 4,236,635 | 12/1980 | Namiki | 206/456 |
| 4,691,826 | 9/1987 | Ozeki | 206/456 |
| 4,724,956 | 2/1988 | Ozeki | 206/456 X |
| 4,928,828 | 5/1990 | Cohen | 206/472 X |
| 5,011,016 | 4/1991 | Ozeki | 206/456 |

Primary Examiner—Bryon P. Gehman
Attorney, Agent, or Firm—Keck, Mahin & Cate

[57] ABSTRACT

A file sheet for filing information recording media in which the information recording media can be inserted in and extracted from either of an upper and a lower direction. Therefore, it is also possible to bind a single kind of file sheet in a spread apart manner.

9 Claims, 4 Drawing Sheets

FILE SHEET FOR FILING INFORMATION RECORDING MEDIA

This application is a continuation-in-part application of patent application Ser. No. 07/413,699, filed Sept. 28, 1989, now U.S. Pat. No. 5,011,016.

FIELD OF THE INVENTION

The present invention relates to a file sheet for filing information recording media in which information recording media having rectangular platelike shape, such as a floppy disc or a film slide can be filed and preserved in good order.

BACKGROUND OF THE INVENTION

FIG. 1A is a plan view showing a conventional file sheet for filing four 3.5 inch floppy discs. The file sheet 1 is formed by a mold of hard plastic, and in the file sheet 1 are provided four substantially square compartments 2 which are parted by a frame 3 formed along four side edges of the sheet and lateral and longitudinal partitions 4 and 5.

The lateral partition 4 is formed in the center portion of the file sheet 1 in the lateral direction to separate the file sheet 1 into upper and lower portions and the longitudinal partition 5 is formed in the center portion of the file sheet 1 in the longitudinal direction to separate the file sheet 1 into right and left portions. That is to say, each compartment 2 is surrounded by a half of a lateral side 3a of the frame 3, a half of a longitudinal side 3b of the frame 3, a half of the lateral partition 4 and a half of the longitudinal partition 5. The floppy discs are filed in these compartments 2.

In each compartment 2, there are provided two lugs 6, one of said lugs being formed at the center of the half longitudinal partition 5a and the other being formed at the center of the half longitudinal frame 3a. These lugs 6 are raised from the bottom surface of the compartment. Therefore, when the floppy disc is filed in the compartment 2, it is held between the lugs 6, 6 and the bottom surface of the compartment 2.

In the bottom surface of the compartment 2, are provided two pairs of pad portions 7,7 and 8,8, which are raised from the bottom surface of sheet 1. A first pair of pad portions 7, 7, which extend substantially parallel with the longitudinal frame 3a and the longitudinal partition 5, are arranged to be separated from each other by a certain distance in the lateral direction such that the floppy disc is stably supported thereby when it is inserted in the compartment 2 along the side walls 7a, 7a of the first pair of pad portions 7, 7. The second pair of pad portions 8, 8 having their length shorter than those of the first pair of pad portions 7, 7 are formed in alignment with the first pair of pad portions 7, 7.

FIG. 1B is a cross sectional view cut along line 1b—1b in FIG. 1A. As clear from FIG. 1B, the upper side walls 7b and 7b of the first pair of pad portions 7, 7 are continued to the side of the upper lateral frame 3b. It should be noted that in the lower two compartments 2, the upper side walls of the first pair of pad portions 7b, 7b are continued to the lateral partition 4. The lower side walls 7a, 7a of the first pair of pad portions 7, 7 are inclined with respect to the bottom surface of the square compartment 2. On the other hand, the lower side walls 8b, 8b of the second pair of pad portions 8, 8 are isolated from the lateral partition 4 and both upper and lower side walls 8a, 8a and 8b, 8b thereof are also inclined with respect to the bottom surface of the compartment 2.

The pad portions 7, 7 and 8, 8 function to hold the floppy disc filed in the compartment 2 in cooperation with the lugs 6, 6. When the floppy disc is inserted in the compartment 2, one of the front and rear edge portions of the floppy disc is slid down along the inclined side walls 7a, 7a of the first pair of pad portions 7, 7 and is slid up along the inclined side walls 8a, 8a, of the second pair of pad portions 8, 8 via the bottom surface of the compartment 2. The inclination of the side walls 7a, 7a and 8a, 8a are determined such that the insertion of the floppy disc into the compartment 2 becomes easy.

When the floppy disc is extracted from the compartment 2, the extracting is made easy by the inclination of the lower side walls 8b, 8b of the second pair of pad portions 8, 8. That is to say, when the floppy disc is to be extracted from the compartment 2, the lower edge portion of the floppy disc positioned on the inclined side walls 8b, 8b is pushed down toward the bottom surface of the compartment 2, and then the other edge portion of the floppy disc, which is positioned on the first pad portions 7, 7, is lifted up. Keeping the posture of the floppy disc, the floppy disc is pushed and slid toward the upper direction and the upper edge portion of the floppy disc rides the lateral frame 3a easily. Thereafter, an operator can pull the floppy disc easily out of the compartment 2. In order to make easy to insert and extract the floppy disc in and from the file sheet, there are provided half-circle portions 3c in lateral frame 3, and portions of the lateral partition 4 are removed.

Further, in one side flange situating outside of the frame 3, there are formed a plurality of holes 9 by means of which a plurality of file sheets may be bound in piles.

In the conventional file sheet 1 described above, however, the upper side walls 7b, 7b of the first pair of pad portions 7, 7 are extended up to the lateral frame 3b or the lateral partition 4. Therefore, when the floppy disc is extracted from the compartment 2, it is impossible to push down the upper edge portion of the floppy disc positioned on the first pair of pad portions 7, 7 toward the bottom surface of the compartment 2. Therefore, in the conventional file sheet 1, the floppy disc has to be inserted into the compartment 2 only from the upper side as shown by an arrow 10 which is integrally formed on the bottom surface of compartment 2, and the extracting direction of the floppy disc is also limited to only toward the upper side, i.e. in the direction opposite to the inserting direction.

As stated above, in the conventional file sheet 1, the inserting direction and the extracting direction of the recording medium are limited to only one direction. Therefore, when binding a plurality of file sheets, the file sheets are bound only in the same orientation. However, in the file sheet 1, in order to form the lugs 6, holes 6a are made in boundary portions between the bottom surfaces of each compartment 2 and the side walls of the longitudinal frames 3a and in a boundary portion between the bottom surfaces of each compartment 2 and the longitudinal partition 5. Therefore, when binding a plurality of file sheets 1 one on the other, the lugs 6 formed in the lower file sheet are inserted in the holes 6a of the upper file sheet and thus two file sheets are intimately bound one on the other. FIG. 2 is a perspective view showing a state where a floppy disc FD is inserted into one of the compartments 2 of two conventional file sheets 1, 1' which are bound exactly on top of each other. That is to say, the floppy disc FD is held between the pad portions 7, 8 formed in the upper file sheet 1 and the lugs 6 formed in the lower file sheet 1'.

In order to avoid that two file sheets are exactly bound to each other, it is useful to bind two file sheets 1 in a spread apart manner, so that the two file sheets are arranged side by side. However, in the conventional file sheet, since the inserting direction and the extracting direction of the recording medium are limited to only one direction, when such file sheets 1 are arranged side by side, the inserting and extracting directions for one sheet becomes opposite to those for the other sheet. In order to avoid such inconvenience, it is necessary to manufacture two kinds of file sheet in which the inserting direction and the extracting direction are made to be opposite to each other so that when the two sheets are arranged side by side, the inserting direction for both sheets is the same.

SUMMARY OF THE INVENTION

The present invention has for its purpose to provide a file sheet for filing information recording media in which the information recording media can be inserted into the file sheet and extracted from the file sheet in both upper and lower (opposite) directions. According to the present invention, it is possible to bind a plurality of file sheets in a spread apart manner, and thus, the state where the recording medium is inserted into two file sheets which are bound to each other exactly, can be prevented.

In order to achieve the above mentioned purpose, the file sheet for filing information recording media according to the invention comprises a rectangular sheet made of hard material and having a generally flat bottom surface, said sheet having the following parts formed integrally therewith:

a frame formed along each side of the sheet and raised from the bottom surface of the sheet by a first distance;

a flange formed outside the frame;

at least one lateral partition formed within a space surrounded by the frame, raised from the bottom surface of the sheet by said first distance and extending in the lateral direction of the rectangular sheet;

at least one longitudinal partition formed within the space surrounded by the frame, raised from the bottom of the sheet by said first distance and extending in the longitudinal direction of the rectangular sheet, said frame and lateral and longitudinal partitions dividing the space formed by the frame into a plurality of rectangular compartments for filing the information recording media therein;

a plurality of lugs formed in the frame and longitudinal partition such that at least two lugs are positioned in each compartment, said lugs being raised from the bottom surface of the sheet by said first distance and projecting over the bottom surface;

a first pair of pad portions raised from the bottom surface of the sheet by a second distance which is smaller than said first distance and positioned in the vicinity of the frame, but being separated from the frame, each of said pad portions including inclined side walls viewed in the longitudinal direction;

a second pair of pad portions raised from the bottom surface of the sheet by said second distance and positioned in the vicinity of the lateral partition, but being separated from the lateral partition, each of said pad portions including inclined side walls viewed in the longitudinal direction; and a plurality of holes formed in the flange along one longitudinal side of the sheet.

As stated above, in the present invention, since the first and second pairs of pad portions are arranged separately from the lateral frame sections and lateral partition, and both upper and lower side walls of these pad portions are inclined, it is possible to lift the edge portion of the recording medium positioned on the first or second pair of pad portions up by pushing the opposite edge portion of the recording medium downwardly, and therefore it is possible to insert and extract the recording medium into and from the compartments in both the upper and lower (opposite) directions. Thus, it is not necessary to manufacture two different kinds of file sheets in order to bind them in a spread apart manner and it is possible to prevent the stacking of recording medium filed in two file sheets which are bound to each other exactly.

DETAILED DESCRIPTION OF THE PREFERRED EMBODIMENTS

Figure 1B:
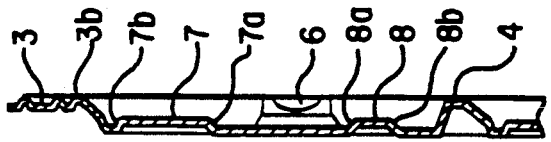
FIG. 1B is a cross sectional view cut along line 1b—1b in FIG. 1A.
Figure 1A:
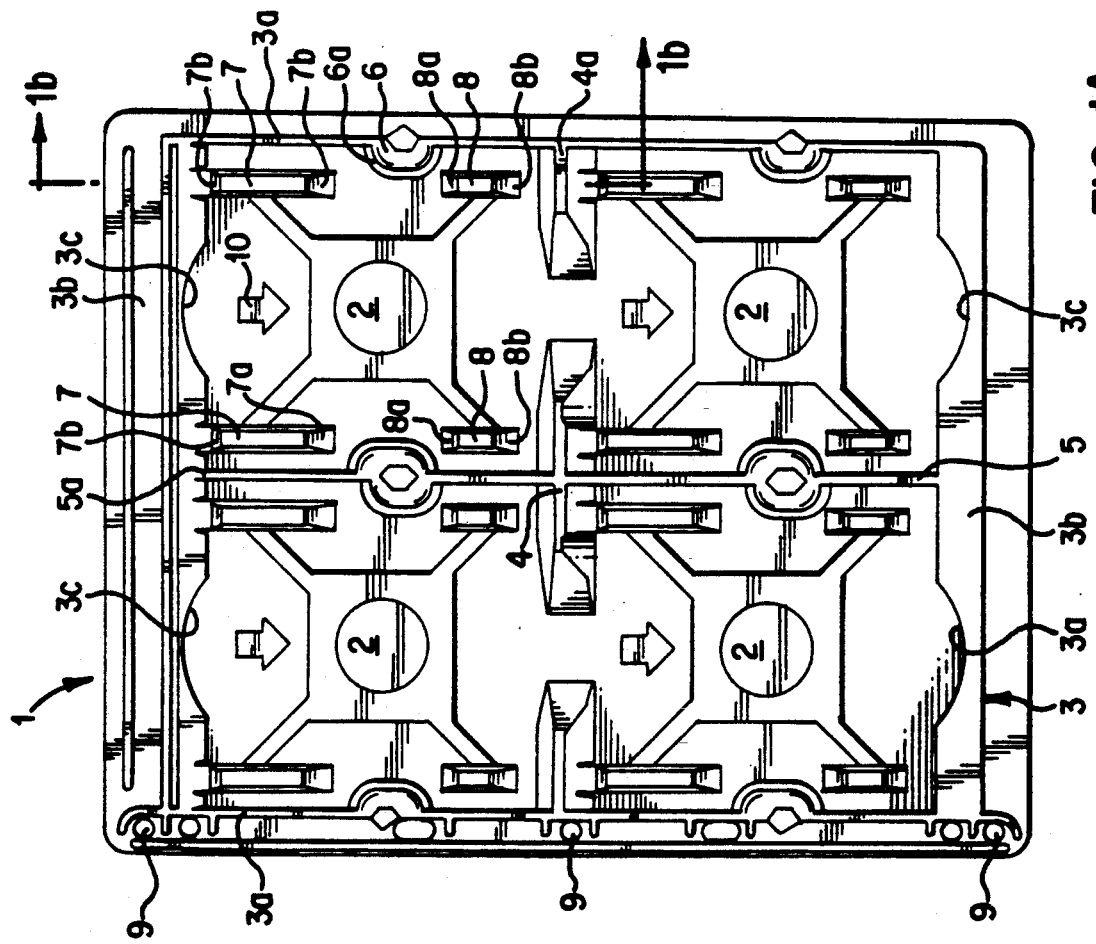
FIG. 1A is a plan view showing the conventional file sheet for filing information recording media.
Figure 2:
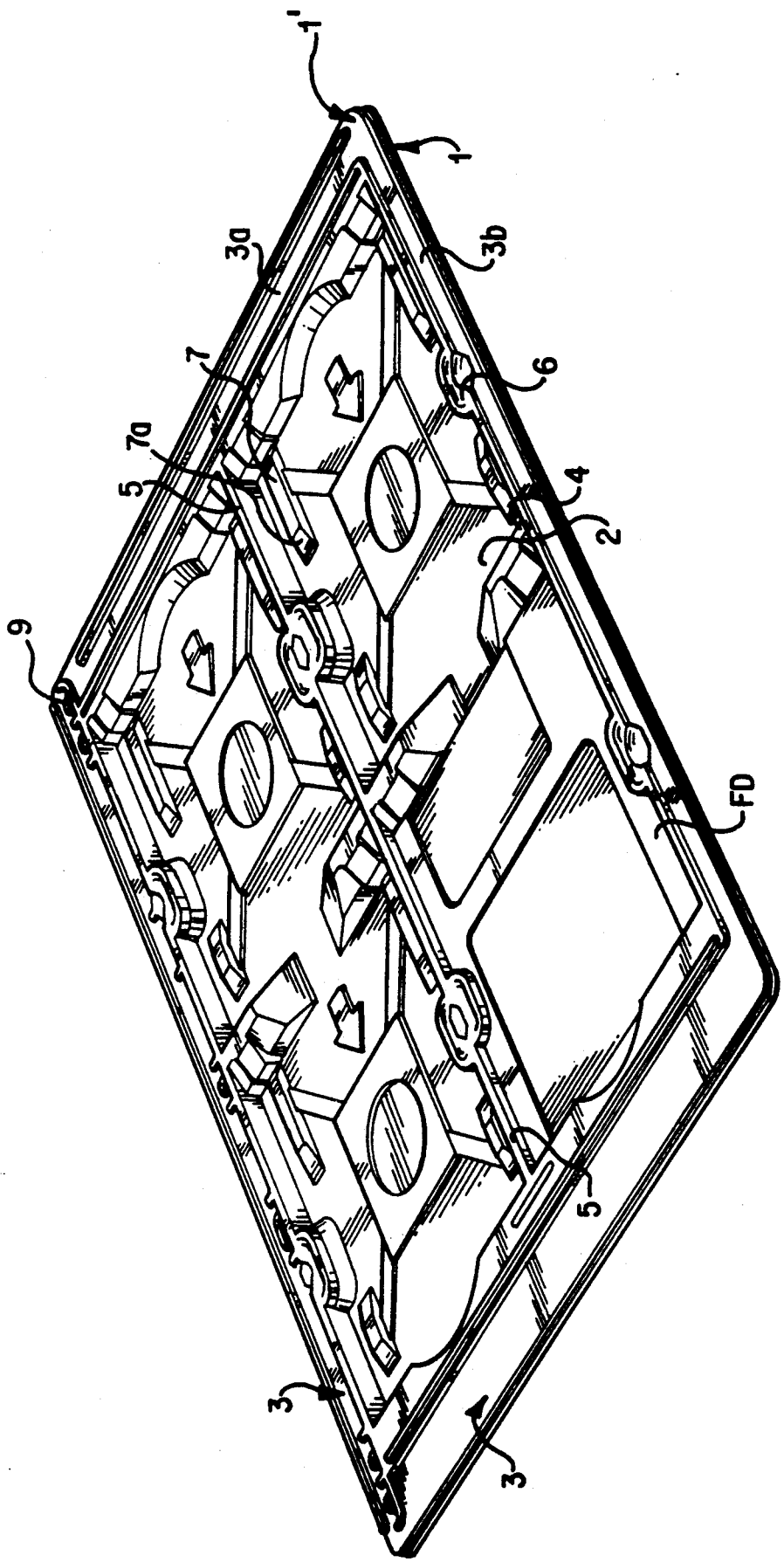
FIG. 2 is a perspective view illustrating a state that a floppy disc is inserted in two file sheets which are bound exactly.
Figure 3A:
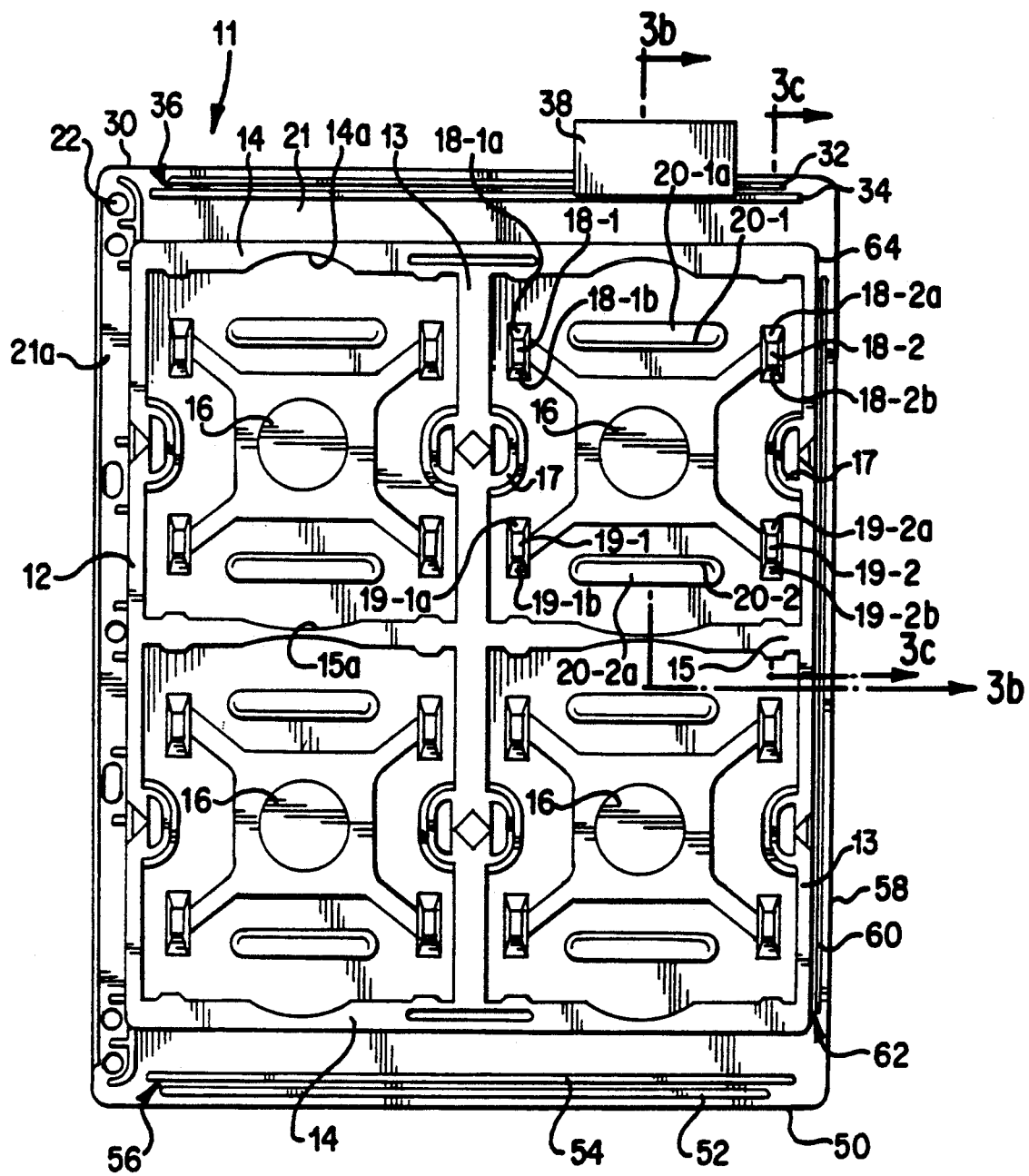
FIG. 3A is a plan view depicting an embodiment of the file sheet for filing information recording media according to the invention.

FIG. 3A is a plan view showing an embodiment of the file sheet for filing recording media according to the present invention.

In FIG. 3A, the numerical number 11 represents the file sheet as a whole 12 and 13 longitudinal frame sections and partition, 14 and 15 lateral frame sections and partition. It should be noted that the longitudinal and lateral frame sections 12 and 14 form a continuous frame which extends along four sides of the sheet. The file sheet 11 is formed by a mold of hard synthetic resin as a single body. The frame 12, 14 and partitions 13, 15 are raised from a bottom surface of the sheet 11 by a first distance 6 to 8 mm, so that a space within the frame is divided into four rectangular compartments 16. In the present embodiment, a 3.5 inch floppy disc can be fitted exactly in each compartment 16.

In each compartment, there are provided two lugs 17 and 17, which are formed at center portions of the longitudinal frame section 12 and partition 13. The lugs 17, 17 are raised from the bottom surface of sheet by the first distance, so that they are aligned with the top surfaces of the frame and partitions.

In the bottom surface of each compartment 16, are formed a pair of first pad portions 18-1, 18-2 and a pair of second pad portions 19-1, 19-2. All of these pad portions extend in parallel with the longitudinal frame section 12 and partition 13. The pad portions 18-1 and 19-1 are arranged in close vicinity of the longitudinal partition 13 and the pad portions 18-2 and 19-2 are provided in close vicinity of the longitudinal frame section 12.

Furthermore, in the bottom surface of each compartment 16, there are provided two third pad portions 20-1 and 20-2 which are made parallel with the lateral frame sections 14 and lateral partition 15, respectively. The upper third pad portion 20-1 is arranged between the first pad portions 8-1 and 8-2, and the lower third pad portion 20-2 between the second pad portions 19-1 and 19-2. All the pad portions 18, 19 and 20 are raised from the bottom of the sheet by a second distance which is smaller than the first distance. The second distance may be 2~4 mm.

The upper and lower side walls 18-1a, 18-2a, 18-1b, 18-2b, 19-1a, 19-2a, 19-1b and 19-2b of the first and second pad portions 18-1, 18-2, 19-1 and 19-2 are inclined. The upper side wall 20-1a of the upper third pad portions 20-1 and lower side wall 20-2a of the lower third pad portion 20-2 are also inclined.

The lower inclined side walls 18-1b, 18-2b of the first pad portions 18-1, 18-2 and the upper inclined side walls 19-1a, 19-2a of the second pad portions 19-1, 19-2 make it easy to insert the floppy disc in the compartment 16. And, when the floppy disc is extracted from the file sheet 11, the upper inclined side walls 18-1a, 18-2a of the first pad portions 18-1, 18-2 and the lower inclined side walls 19-1b, 19-2b of the second pad portion 19-1, 19-2, the upper and lower inclined side walls 20-1a, 20-2a of the third pad portion 20-1 and 20-2 make the movement of the floppy disc smooth. That is to say, when extracting the floppy disc from the file sheet 11, first of all, an operator pushes one of the front and rear edge portions of the floppy disc down, and then the other edge portion thereof is lifted up, and thereafter, the operator can easily slide the floppy disc in an upper or a lower direction to slide out the floppy disc from the compartment 16.

The upper side walls 18-1a, 18-2a of the first pad portions 18-1, 18-2, the lower side walls 19-1b, 19-2b of second pad portions 19-1, 19-2 and the upper side wall 20-1a of the third pad portion 20-1 and the lower side wall 20-2a of the third pad portion 20-2 may be formed to be perpendicular to the bottom surface of the compartment 16 when the upper and lower side walls are separated from the lateral frame section 14 and lateral partition 15 by a sufficiently long distance. Even in this case, when extracting the floppy disc from the file sheet 11, it is sufficient to lift the side portion of the floppy disc up.

Further, in the center portions of the frame lateral sections 14 and lateral partition 15, there are provided concaved portions 14a, 15a in order to make it easy to push down the floppy disc when extracting the floppy disc from the file sheet 11.

In the file sheet 11, is integrally provided a flange 21 outside of the frame 12, 14. In one longitudinal side 21a of the flange 21, there are provided a plurality of holes 22 for binding a plurality of file sheets.

The floppy disc is inserted into the compartment 16 of the file sheet 11 in the following manner. First of all, one edge portion of the floppy disc is positioned on the lower inclined side walls 18-1b, 18-2b of the first pad portions 18-1, 18-2 or on the upper inclined side walls 19-1a, 19-2a of the second pad portions 19-1, 19-2, and thereafter the floppy disc is inserted under the lugs 17, 17 along the inclined side walls by pushing the other edge portion of the floppy disc inside. The other edge portion of the floppy disc is further pushed up or down until the floppy disc is completely inserted in the compartment 6. The floppy disc is supported between the lugs 17, 17 and the pad portions 18, 19, 20 in a positive manner.

Extracting the floppy disc filed in the file sheet 11 is as follows. Pushing one side portion of the floppy disc positioned in the vicinity of the lateral frame sections or partition 14 or 15 downwardly, the other side portion of the floppy disc is lifted and the floppy disc is inclined by using a fulcrum of edges of the lower side wall 18-1b, 18-2b of the first pad portion 18 or edges of the upper side wall 19-1a, 19-2a of the second pad portion 19. Thereafter, said one edge portion of the floppy disc is slid in the longitudinal direction, the other edge portion of the floppy disc rides on the lateral partition 14 or 15. The floppy disc is removed from the lugs 17, 17 by further sliding the side portion and pulling it by the operator. As stated above, the pad portions 18, 19 and 20 are arranged so as to make the compartment 16 symmetrical with the lateral center line thereof, so that it is possible to insert and extract the floppy disc in and from the file sheet in either of upper and lower directions.

Figure 3B:
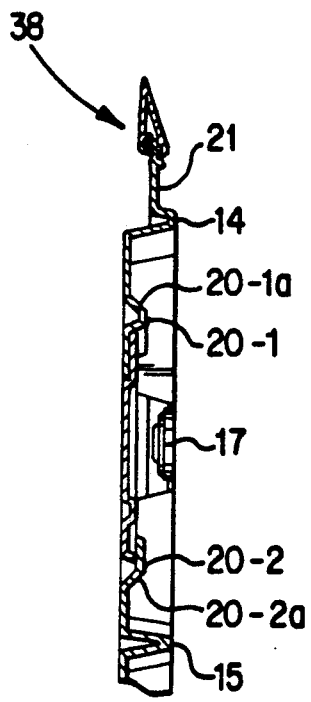
FIG. 3B is a cross sectional view cut along line 3b—3b of FIG. 3A.
Figure 3C:
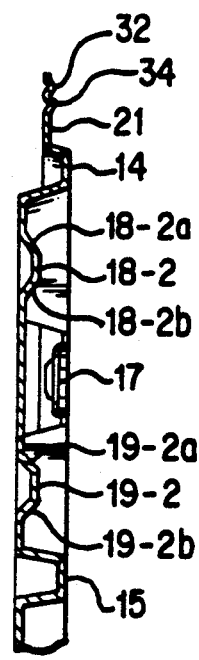
FIG. 3C is a cross sectional view cut along line 3c—3c of FIG. 3A.

FIG. 3B is a cross-sectional view cut along line 3b—3b in FIG. 3A, and FIG. 3C is a cross-sectional view cut along line 3c—3c in FIG. 3A in which the inclined side walls of each pad portions 18-2, 19-2, 20-1, 20-2 are illustrated.

At the top 30 of the file sheet 11 are formed two parallel extending projections 32 and 34 on a front side 31 of the sheet 11. Corresponding grooves are formed on the opposite or rear side 33 of the file sheet 11 by the projections 32, 34. Defined between the projections 32, 34 is a channel 36.

Slidably mounted on the top 30 of the file sheet 11 is an index tab 38. The index tab assists in turning of the file sheet 11 and is also suitable for recording indicia to label the contents of the file page 11.

Figure 3D:
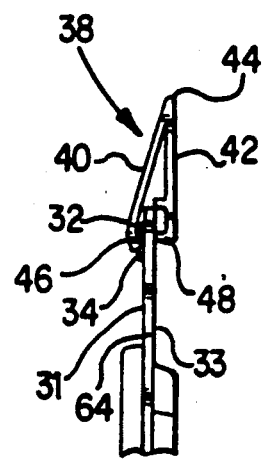
FIG. 3D is a side elevational view of a portion of the file sheet and an index tab.

The index tab 38, as shown in FIGS. 3B and 3D is of a C-shaped construction. The index tab includes two side walls 40 and 42 biased towards each other and joined along edge 44. A projection 46 depending from a lowermost edge of side wall 40 is located within channel 36 formed between projections 32 and 34. A corresponding projection 48 located at the lowermost edge of side wall 42 engages the rear side 33 of the file sheet 11. Since the side walls 40, 42 of the index tab 38 are spread apart from each other by engagement with opposite sides of the file sheet, there is a bias due to the plastic construction of the index tab 38, to engage in a secure fashion the opposite sides 31, 33 of the file sheet 11.

To locate the index tab on the upper edge 30 of the file sheet, the side walls 40, 42 of the index tab are forcibly spread apart using the file sheet as a wedge until the projection 46 is lodged in the channel 36 formed between the projections 32 and 34.

A similar grooved structure is formed at the bottom 50 of the file sheet by projections 52, 54 defining channel 56 therebetween. An index tab having a C-shape is similarly located at the bottom 50 of the sheet as is done at the top 30 of the sheet.

For mounting of an index tab on lateral side 58, a projection 60 and an edge 64 of longitudinal side frame partition 13 form a channel 62 therebetween. Again as with the top and bottom 30, 50, respectively, the projection 46 of side wall 40 of the index tab 38 is slid into the channel 62, while spreading the side walls 40, 42 apart, so as to reliably secure the index tab on the side 58 of the file sheet 11.

The present invention is not limited to the above stated embodiments, and many variations may be conceived by those skilled in the art. In the above stated embodiment, four compartments are formed per one file sheet. However, six or more compartments can be formed by increasing the number of the lateral and longitudinal partitions in order to file smaller size recording medium such as slide films.

I claim:

1. A file sheet for filing information recording media said file sheet comprising a rectangular sheet made of hard material and having a generally flat bottom surface, said sheet having the following parts formed integrally therewith:

a frame formed along each side of the sheet and at least one lateral partition and at least one longitudinal partition, said frame being raised from a bottom surface of the sheet by a first distance;

a flange formed outside the frame;

said at least one lateral partition being raised from the bottom surface of the sheet by said first distance and extending in a lateral direction of the rectangular sheet;

said at least one longitudinal partition being raised from the bottom of the sheet by said first distance and extending in a longitudinal direction of the rectangular sheet, said frame, said at least one lateral partition and said at least one longitudinal partition dividing the space formed by the frame into a plurality of rectangular compartments for filing information recording media therein;

a plurality of lugs formed in the frame and said at least one longitudinal partition such that at least two lugs are positioned in each compartment, said lugs being raised from the bottom surface of the sheet by said first distance and projecting over the bottom surface;

at least one of a top, a bottom and a side of the sheet having means for retaining an index tab in engagement with the sheet, said means including two parallel extending projections defining a channel therebetween for receipt of a portion of an index tab;

at least one pair of pad portions in each compartment raised from the bottom surface of the sheet by a second distance smaller than said first distance and including inclined side walls viewed in the longitudinal direction of the frame so that information recording media may be both inserted and withdrawn from opposite sides of said frame; and a plurality of holes formed in the flange along one longitudinal side of the sheet.

2. A file sheet as claimed in claim 1, wherein four compartments are provided in the sheet.

3. A file sheet as claimed in claim 1, wherein said means is located at one of the top and the bottom of the sheet.

4. A file sheet as claimed in claim 1, wherein said two projections includes a projection extending parallel to and separated from an edge of one of said at least one longitudinal partition and defining the channel therebetween for receipt of a portion of an index tab.

5. A file sheet as claimed in claim 4, wherein said means is located at the side of the sheet.

6. A file sheet for filing information recording media, said file sheet comprising a rectangular sheet made of hard material and having a generally flat bottom surface, said sheet having the following parts formed integrally therewith:

a frame formed along each side of the sheet and at least one lateral partition and at least one longitudinal partition, said frame being raised from a bottom surface of the sheet by a first distance;

a flange formed outside the frame;

said at least one lateral partition being raised from the bottom surface of the sheet by said first distance and extending in a lateral direction of the rectangular sheet;

said at least one longitudinal partition being raised from the bottom of the sheet by said first distance and extending in a longitudinal direction of the rectangular sheet, said frame, said at least one lateral partition and said at least one longitudinal partition by dividing the space formed by the frame into a plurality of rectangular compartments for filing information recording media therein;

a plurality of lugs formed in the frame and said at least one longitudinal partition such that at least two lugs are positioned in each compartment, said lugs being raised from the bottom surface of the sheet by said first distance and projecting over the bottom surface;

a first pair of pad portions in each compartment raised from the bottom surface of the sheet by a second distance smaller than said first distance and positioned adjacent to the at least one lateral partition and the at least one longitudinal partition of the frame and separated from the at least one lateral partition and the at least one longitudinal partition of the frame by a portion of said bottom surface, each of said first pair of pad portions including inclined side walls viewed in the longitudinal direction of the frame;

a second pair of pad portions in each compartment raised from the bottom surface of the sheet by said second distance and positioned adjacent to the at least one lateral partition and the at least one longitudinal partition and separated from the at least one lateral partition and the at least one longitudinal partition by a portion of said bottom surface, each of said second pair of pad portions including inclined side walls viewed in the longitudinal direction of the frame;

at least one of a top, a bottom and a side of the sheet having means for retaining an index tab in engagement with the file sheet, said means including two parallel extending projections defining a channel therebetween for receipt of portion of an index tab; and a plurality of holes formed in the flange along one longitudinal side of the sheet, so that information recording media may be both inserted and withdrawn from opposite sides of said frame.

7. A file sheet as claimed in claim 6, wherein said means is located at one of the top and the bottom of the sheet.

8. A file sheet as claimed in claim 6, wherein said two projections includes a projection extending parallel to and separated from an edge of one of said at least one longitudinal partition and defining the channel therebetween for receipt of a portion of an index tab.

9. A file sheet as claimed in claim 8, wherein said means is located at the side of the sheet.

* * * * *